Oct. 11, 1966 E. KAY 3,278,407

DEPOSITION OF THIN FILM BY SPUTTERING

Filed June 26, 1963 3 Sheets-Sheet 1

INVENTOR.
ERIC KAY

BY *John J. McCormack*

ATTORNEY

United States Patent Office 3,278,407

Patented Oct. 11, 1966

3,278,407

DEPOSITION OF THIN FILM BY SPUTTERING

Eric Kay, Campbell, Calif., assignor to International Business Machines Corporation, New York, N.Y., a corporation of New York Filed June 26, 1963, Ser. No. 290,794
3 Claims. (Cl. 204—192)

The present invention relates to improved methods and apparatus for depositing thin films comprising particles sputtered from a cathode, and more particularly, to such apparatus wherein the placement and charging of control elements is prescribed so as to control the form and the quality of said films.

Interest in thin film studies has increased sharply over the past decade, largely as a result of the extensive applications for thin film devices foreseen by the electronic industry. Considerable attention has been devoted to magnetic and superconducing thin film surfaces because of their potential as memory and switching elements in digital computers, where high operational speed, large memory capacity and manufacturing economy are of prime importance. No less imposing has been the emphasis on fundamental thin film research which, because of the special geometry of these films, has given better insight into a number of solid state phenomena.

Common to all these thin film studies has been an intense evaluation of the mechanisms for preparing thin films. Some of the numerous preparation mehods available are: vacuum deposition, a popular method though it involves evaporation techniques which possess serious intrinsic limitations, electrodeposition, chemical vapor deposition, electrophoretic deposition, electroless plating and impact evaporation.

Interest in sputtering in a glow discharge environment, sometimes called "impact evaporation" and hereinafter referred to as such, is rising with workers in the film coating art due to the fact that crystalline structure, chemical purity, particle size and surface morphology of refractory and multicomponent materials, all can be closely controlled by this process. This is especially true in the deposition of magnetic thin films. For such films, sputtering has the further advantage of providing a uniquely precise control over the magnetic properties of the film. Such magnetic properties can be reproducibly obtained in glow discharge devices by such things as the appropriate location of the collecting substrate with respect to the characteristic zones of the glow discharge; that is, the Crookes Dark Space, negative glow, positive column zones, etc. FIG. 8 delineates these zones. This latter control is a result of zonal variations in deposition rates and in the energy distributions and incident angle of material arriving at the substrate and involves different intensities of electron bombardment with consequent variations in the heating of the substrate. For instance, operating with the substrate in the strict diffusion-controlled zone gives a desirable crystalline isotropy, eliminating the anisotropy resulting from the obliquely incident particles and damaging the uniformity of the film.

The glow discharge environment for effecting sputtering or impact evaporation is a very sensitive one. Impact evaporation occurs when a surface (the target) is bombarded with high-energy charged particles which produce ejection of surface atoms. Diffusion processes are relied upon to transport the atoms to the substrate. The ejected atoms can then be condensed upon a substrate to form a thin film. Such a glow discharge provides a favorable but highly complex environment for the nucleation and growth of a thin film. For example, a substrate is subjected not only to the impinging material sputtered from the cathode, but also to electron bombardment and, often, ion bombardment, the intensity and directionality of which depend entirely on the specific location of the substrate within the glow discharge zones, as well as upon the direction of applied external magnetic fields. At the high-pressure end of a typical discharge pressure-spectrum (i.e., about $10^{-1}$ mm. Hg), the transport mechanism for sputtering material upon the substrate is mostly diffusion-controlled, whereas at the lower limit of the pressure range ($10^{-4}$ mm. Hg), transport is by molecular flow. Hence, glow discharge pressures critically influence deposition. The mean-free-path of sputtered material in the intermediate pressure range is difficult to determine. Although it has been clearly demonstrated that sputtered particles leaving the cathode are largely neutral, this may change with subsequent changes in mean-free-paths, depending on the extent of charge-exchange and ionization between particles traveling from cathode to substrate. Naturally, the amount of ambient gas arriving at the substrate is quite different at the two pressure extremes, as is the energy spectrum of sputtered material. If the substrate is within the mean-free-path of the sputtered material, as is quite feasible at $10^{-4}$ mm. Hg, then the particles having energies up to 30 ev. can arrive at the substrate. Such high energies affect not only the thermal-accommodation coefficient at the substrate, but also the mobility of the material condensing on the substrate. This, in turn, will affect particle agglomeration and crystallinity—both controlling factors in the magnetic properties of thin films.

The voluminous film deposition literature of the past is often controversial, sometimes even misleading in its teaching. Hence, it must be evaluated with caution, largely because of the tremendous obstacles to accurately describing the conditions prevailing at a substrate during film deposition. Many of these conditions are only crudely understood at present. Recently, however, such new evaluation tools as high resolution electron microscopy and diffraction techniques have made inroads into the problems of understanding nucleation and film growth during deposition under high vacuum conditions and are helping to clarify these processes. Compounding the difficulties with sputtered film deposition, as such, have been the difficulties of understanding and controlling the glow discharge environment itself. In view of these difficulties and in view of the need for sputtering systems which can deposit a thin film which is homogeneous, both in particle character and in conformation, especially in magnetic applications, workers in the art have become increasingly concerned about two major problems with sputtered films: uniformity of deposition-profile and purity. The instant invention provides a solution for these problems.

The present invention provides a solution to the above problems and disadvantages in prior art sputtering systems according to a novel sputtering apparatus wherein a critical minimum cathode-to-substrate distance is specified; wherein a critical cathode-shield configuration and dimension is specified; wherein a particular shield-charging level is specified; and wherein a charged wall and a vessel flushing technique are prescribed to reduce non-uniformities and contamination in sputtered films.

Hence, it is an object of the present invention to provide a homogeneous thin film through impact evaporation by a particular positioning of the substrate.

Another object of the invention is to improve impact evaporation by flattening the erosion profile of a cathodic material and thus increase both the useful area of the cathode and the homogeneity of the deposited film.

Still another object is to improve the homogeneity of sputtered films by providing a cathodic shield of particular dimensions.

A further object is to provide a cathodic shield voltage of specified magnitude so as to flatten the erosion profile and, in turn, flatten the deposition profile.

Still another object is to improve the homogeneity of impact-evaporated films by locating the substrate a specified minimum distance from the cathode so that the directionality of the electrons proceeding therefrom is a minimum and that the consequent electron-generation of charged bombarding particles is homogeneous across the cathode surface.

Systems in accordance with the present invention have many different aspects and represent a novel approach to the problems associated with the sputtering of thin films, providing significant advantages therefor.

The foregoing and other objects, features and advantages of the invention will be more apparent from the following, more particular description of a preferred embodiment of the invention, as illustrated in the accompanying drawings, wherein.

Figure 1:
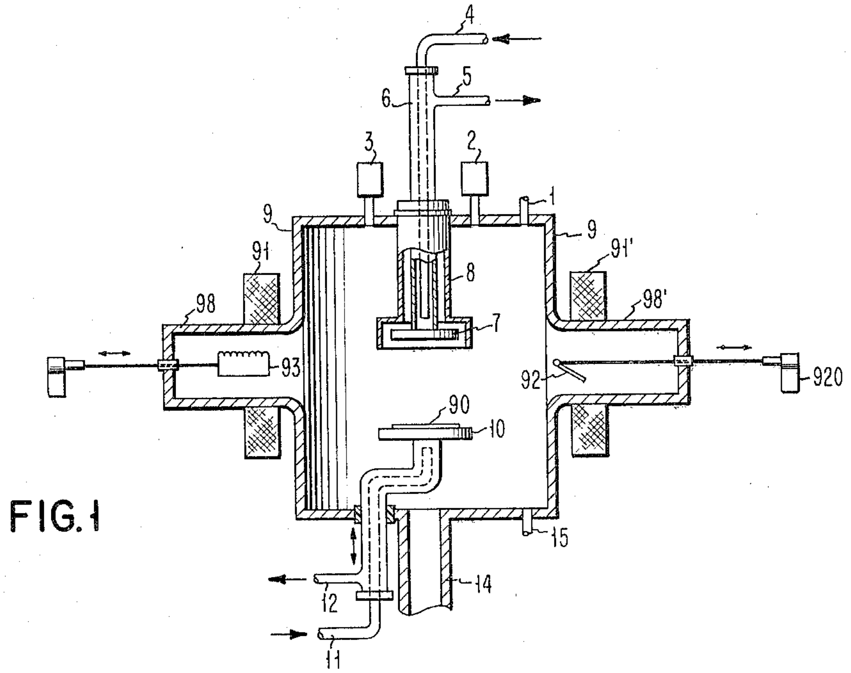
FIG. 1 is a schematic sectional view of a typical sputtering system in which the invention may be aptly employed.

The setting wherein the invention is performed is best understood by reference to FIG. 1 wherein is shown the overall glow discharge apparatus configuration. The glow discharge apparatus is confined in a vessel 9 which is pressure-resistant so as to accommodate evacuation to pressures in the range $10^{-1}$ to $10^{-7}$ Torricelli. Vessel 9 may be composed of a ceramic or, alternatively, a metal, so as to readily distribute an electric charge.

The vessel 9 comprises a glass envelope of cross-configuration in the preferred embodiment shown in FIG. 1, wherein the walls are at least 2″ from the perimeter of the anode. In magnetic thin film sputtering work, the smallest diameter envelope compatible with this requirement was used since a uniform magnetic field in the plane of the film had to be produced by very large (~30″ I.D.) Helmholtz coils 91, 91′ mounted externally to the envelope. These coils were arranged to produce a field uniform to 0.1% over 6″ sphere. A bell jar could be used alternatively, but is not as appropriate since several movable parts such as shield 92 have to be removed quickly as far from the discharge as possible during the deposition process. In the 11″ cross used in FIG. 1, collapsible shields 92 and heater 93 could be conveniently withdrawn into the side arms of the cross and still allow the Helmholtz coils to be brought close to the electrode assembly. This closeness is vital as the field degenerates with the square of the distance from the discharge area.

Figure 6:
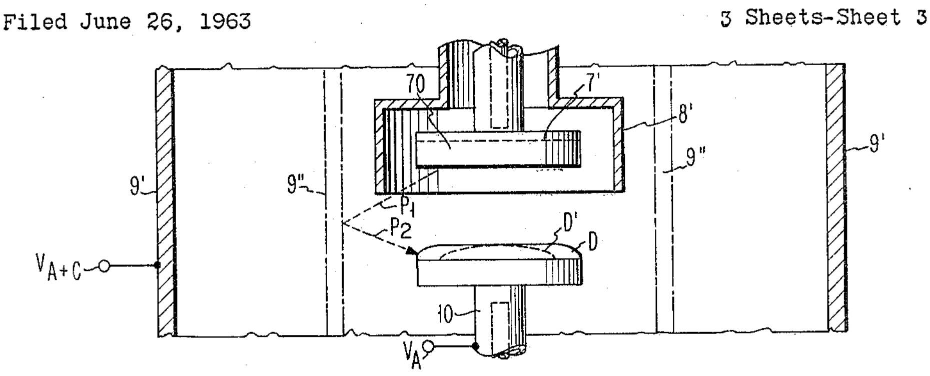
FIG. 6 is a sectional showing of the inventive sputtering device as modified to minimize the wall effect.

The cathode 7 of this two-electrode glow discharge apparatus is planar and made of the material to be transported, i.e., deposit material. However, it may, optionally, be merely overlaid with a sheet of the depository material, the basic configuration of the cathode being kept standard. Such a sheet 70 is shown in FIG. 6. In magnetic thin film work this sheet must be as thin as possible so as not to distort the magnetic field unnecessarily. 10–20 mil. magnetic sheets are commonly used. The substrate 90 is affixed upon the face of anode 10. Anode

10 is, of course, adjustable in the cathode-anode axial direction so as to allow a change of location of the substrate mounted thereon. The only limitation as to joining substrate 90 to anode 10 is that the connection should provide good thermal conduction. Anode 10 may be of any conductive, heat resistant metal, such as aluminum. For magnetic film sputtering the anode 10 must be nonmagnetic. Both cathode and anode are water-cooled so that their temperatures can be maintained as low as room temperature if desired. Cooling units are provided in jacket form within the base 6 of the cathode 7 and also within the anode 10. Any suitable coolant such as water may be pumped in at cathode inlet 4, emerging at outlet 5 to be cooled and recirculated. Likewise, inlet 11 and outlet 12 provided the coolant for the anode 10. The cathode-anode potential drop can be varied between 0–5000 ev. using a 5 kv.–500 ma. low impedance filtered D.C. power supply. Desired glow-discharge effects occur usually in the pressure range of $10^{-1}$ to $10^{-4}$ mm. of Hg. But, in order to maintain a glow discharge in the lower pressure regions, where the mean-free path of electrons is large, the ionization efficiency has to be increased in several ways. One way is by superimposing an external quadrupole magnetic field on the discharge, thus increasing the effective path of the colliding electrons and hence the probable number of bombarding particles generated by these collisions.

Diffusion pump 81″ (cf. FIG. 8) is used to pump down to glow discharge pressures and thereafter maintain constant pressure while clean gas is being fed in at port 15. But ion current density is very sensitive to small pressure fluctuations. Therefore, the flow rate of inert gas through the system must be closely regulated by balancing the gas input from reservoir 65″ through port 15 with the output through outlet 14 to pump 81″. This is done by balancing the gas input through a variable leak, for instance, double-needle valve 87″ in FIG. 8, against the pumping speed of the diffusion pump connected to outlet 14. This is superior to merely throttling the diffusion pump as done in the prior art. This diffusion pump is of the oil diffusion type having a capacity of about 700 liters per minute and able to achieve a minimum pressure of about $2\times10^{-7}$ mm. Hg in the glow discharge chamber of FIG. 1. A liquid nitrogen trap is regularly used in the input line to the pump.

Figure 2:
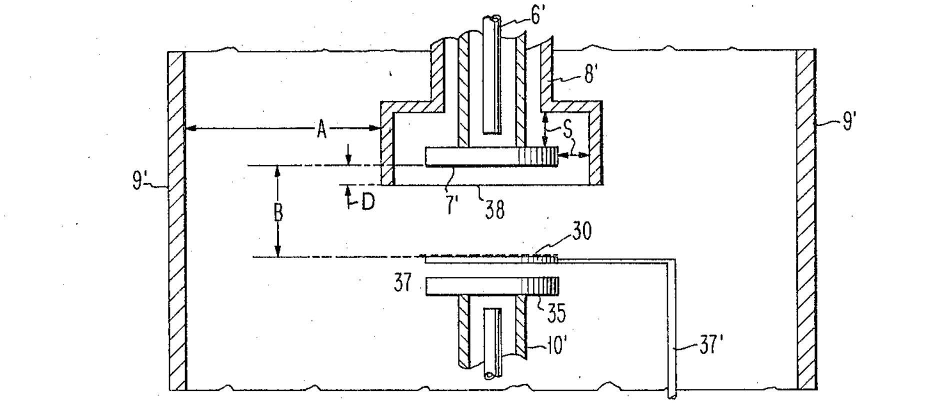
FIG. 2 shows schematically the cathode, shield and substrate locations according to the invention.

The glow discharge zones are contained according to the invention by the use of both an external magnetic field means (not shown) and of appropriately charged and shaped shielding means. Such a shielding means 8′ is shown in FIG. 2 as generally of a cup-configuration. When placed around planar cathode 7′, shield 8′ prevents discharge except normally from cathode face 7′, toward anode 35. The shielding must be placed within the Crookes Dark Space (CDS) distance from the cathode assembly 6′, 7′ to assure a discharge-free area between the cathode and the shielding. The anode 10′, whose configuration is not critical, can be placed at varying distances from the cathode, within the range, for instance, of 2.5–10 cm.; but beyond the "shadow-zone," it should be as close as possible for efficiency. The cathode cross-sectional area, however, should be at least as large as the substrate to assure maximum efficiency, as substrate 90 shows. Particular electrode areas, as related to sputtering efficiency, are recited below. The common glow discharge characteristics (e.g., current, pressure, voltage and geometry) are interrelated by well established similarity laws. Such laws are explained, for instance, in the Encyclopedia of Physics, edited by E. Flugge (Springer-Verlag, Berlin, Germany, 1956, vol. 22). These zones and parameters reflecting this are schematically plotted in FIG. 7.

Figure 7:
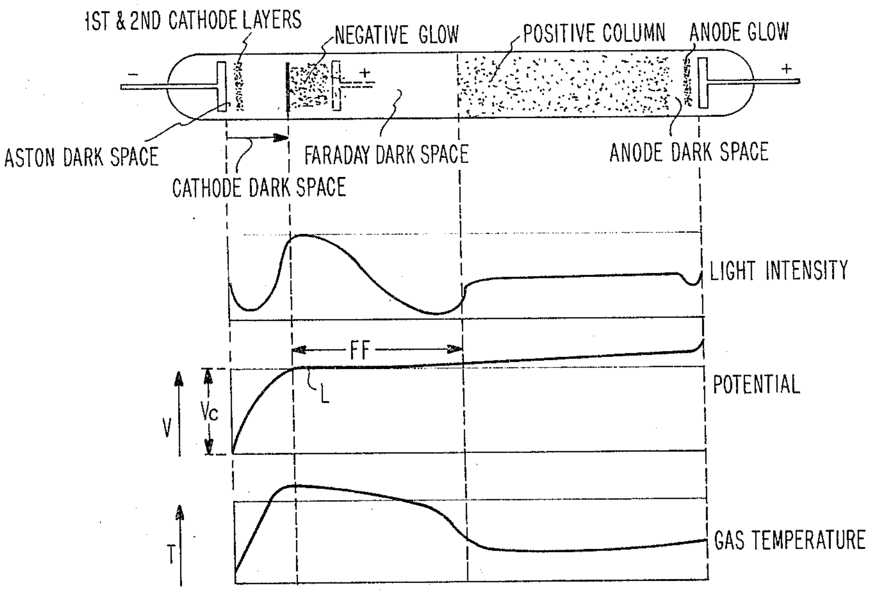
FIG. 7 shows the variations of discharge parameters and the location of glow discharge zones along the length of a typical sputtering device.

FIG. 7 schematically shows the variation of glow discharge characteristics along the length of the cathode-anode discharge for a typical glow discharge. This diagram and the following description may serve to clarify some of the terms used in the instant case. A glow discharge in these configurations will take place only in a pressure range of between 1 and 200 microns Hg. Lower pressures are possible in the presence of magnetic fields. The glow discharge is maintained by electrons produced at the cathode as a result of positive ion bombardment, which electrons, in turn, will be driven towards the anode, thereby producing more positive ions to bombard the cathode, eroding particles therefrom which then diffuse toward the substrate and deposit thereon. In the Aston Dark Space, there is an accumulation of these electrons which gain energy through the Crookes Dark Space, also called cathode fall or cathode dark space. The decay of excitation energy of the positive ions on neutralization gives rise to the cathode glow. The electrons which have passed through the Crookes Dark Space enter a constant-field space, some of them with fairly high velocities. This space is the negative glow region. Here they lose their energy in further inelastic collisions in which some of them cause ionization and excite atoms, thus causing the "negative glow." The end of negative glow corresponds to the range of electrons with sufficient energy to produce excitation. Beyond this, in the Faraday Dark Space, the electrons once more gain energy. The Positive Column is the ionized region that extends from the Faraday Dark Space almost to the anode.

A reduction in pressure causes the cathode dark space to expand at the expense of the Positive Column because electrons must now travel farther (mean-free-path is greater) to produce efficient ionization. This phenomenon shows that the ionization processes in the cathode dark space are essential for maintenance of the discharge. The Positive Column merely fulfills the function of a conducting path between the anode and negative glow region. For the discharge to be maintained, an electron must, in its passage through the gas, produce that number of positive ions which, on striking the cathode, will release a new electron. If this requirement is not met, the cathode dark space will expand until it contacts the anode-electrode at which point the discharge will be extinguished.

It will be noted above that the instant invention has been practiced only with an "abnormal truncated type of glow discharge." Such a discharge is called "truncated" because the "Positive Column" and "Faraday Dark Space" regions of FIG. 7 are eliminated and all the discharge sustaining activity occurs in the negative glow and Crookes Dark Space regions. It is called "abnormal" because the discharge is confined to the voltage dependent, high current region on the voltage-ion current curve.

Evaluation was made of the films sputtered with the device of FIG. 1, using transmission and reflection electron microscopy and diffraction for crystalline structure, using spectrophotometry on pre-weighted films with an ultra-micro balance for chemical analysis, using interferometry for thickness measurements, a Kerr Magneto Optic system for magnetic properties, and mass spectrometry for gas content. These evaluations indicated satisfactory sputtering operation of the system and helped to monitor the control techniques introduced according to the invention as described below.

Before describing the details of these sputtering control techniques, it is useful to consider the parameters whereby their effectiveness is measured. One such parameter, and an important gauge of sputtering success, is film-thickness-profile. The comprehensive nature of this property as an analytical tool of delineating the uniformity of several film growth parameters make it one of the most useful criterion for setting limits of control over these parameters. On a homogeneous substrate surface with no temperature gradients, areas of uniform film thickness qualitatively imply uniform rate of arrival of incident particles leading to uniform particle size and shape distribution in the resultant film, as well as crystallographic uniformity. Control over these particular parameters is especially important in the study of magnetic properties, as well as for producing films.

In the commonly used glow discharge with a parallel, planar electrode configuration as in FIG. 1, the thickness profile on a substrate will depend on a control of the transport mechanism of sputtered particles from the source (cathode) to the substrate.

The experimentally measurable quantities upon which the film thickness profile will depend are: (1) the ion energy, current density, direction of ion incidence and resultant erosion profile at the cathode surface; (2) substrate location; (3) magnitude of the cathode fall potential; (4) the pressure and subsequent mean-free-path of sputtered particles; and (5) proximity of the envelope walls with respect to the substrate. These parameters above are all related to one another and variation of any one of them will reflect itself in the thickness profile at the substrate in a logical fashion.

Film profile is directly related to the cathode erosion profile (cf. A, B, and C of FIG. 3) which initiates the deposited particles. Further, the configuration of the erosion profile depends upon the ion current density profile. A radially nonuniform ion current density profile at the cathode will result in a radially nonuniform cathode erosion profile. The ion current density profile at the cathode will depend on the shape of the electric field near the cathode. This is related to: (1) the geometry of the cathode assembly and its position relative to the apparatus envelope; (2) the distance of the substrate and anode assembly to the cathode. The invention specifies these parameters optimally in the descritpion of FIG. 2 below. Table I, below specifies the conditions obtaining in FIG. 3, wherein these parameters are related to sputtering efficiency.

*Table I*

| Profile Curve (Fig. 3) | Conditions | Percent Surface Made Useful |
|---|---|---|
| A | No cup-shield | A few percent. |
| A′ | do | A few percent. |
| B | Cup-shield provided: $V_K$, 2,000; $V_{Shield}$, $V_A+5$. | About 95 percent. |
| B′ | do | About 95 percent. |
| C | Cathode "shadowing effect" | A few percent. |
| C′ | do | Zero percent. |

Workers in the art have noted there is always a central area of uniform current density at the cathode and that this area decreases as the cathode fall potential and ion current increases. Some characterize a "dead zone" around the perimeter of the cathode where no sputtering takes place at all. The area of this dead zone increases as the pressure decreases. Many prior art workers have believed that this situation is inevitable when an effective cathode cooling assembly is required and that this dead zone can get larger than the actual sputtering area as the pressure decreases into the range of interest in our work. My invention demonstrates, however, that these undesirable effects can all be related to the manner in which the apparatus geometry in the vicinity of the cathode distorts the electric field near the cathode. Various methods of shaping the electric field are indicated below in FIGS. 4 and 5 by charging the shield of FIG. 2.

In FIG. 2 there is shown in detail the cathode shielding means in combination with the preferred location of the substrate according to the invention. As in FIG. 1, the cup shielding means 8′ surrounds the cathode 7′ which, in turn, is mounted upon a suitable stem means 6′. As before, the cathodic surface may be either entirely of the depository material or have a removable face plate thereon for attaching the cathodic material removably thereto.

The depository cathode material should be free of contaminants able to cause reactions from the vessel or gas. The extent of unwanted chemical reaction will depend, in part, upon the purity and temperature of the target material, the degree to which its surface was precleaned, and the purity of the bombarding gaseous species, as well as the time of exposure and the rate of ejection by impact evaporation.

The relative dimensions of cathode 7' and shield 8' are of prime importance. The critical dimensions are indicated by dimension S and dimension D in FIG. 2. Dimension S must be less than the width of the Crookes Dark Space (i.e., cathode dark space, FIG. 7) or the distance to the virtual anode. A suggested practical distance (S) used in actual practice is about 1/16 inch. It is absolutely essential that this minimum dimension of S be maintained uniformly about the entire cup-shaped periphery of the cathode so as to allow no discharge to the support structure when the CDS approaches the value of S. It is also important to maintain another, related critical distance D; namely, the distance between the cathode surface and the edge of the cup lip 38. This distance should be between 1/8 and 3/8 inch. Its criticality is seen in its effect upon the erosion profile and the film, both of which it flattens. Theoretically, the reason is a reduction in the higher "erodibility" of the edge-incident ions due to their higher energy and their oblique angle of incidence, tending to impart added momentum to eroded particles. This edge-effect is graphically illustrated by comparing FIGS. 4 and 5, described below.

Figure 3:
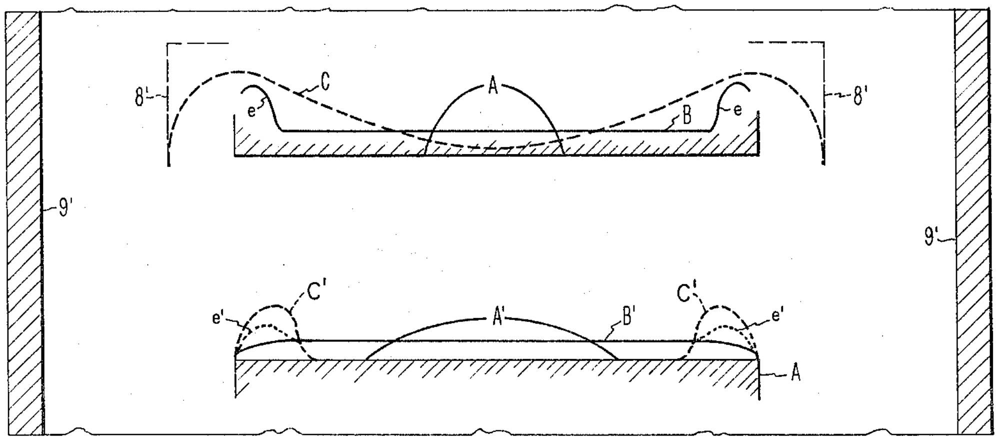
FIG. 3 is a representative plot of various erosion-deposition profiles in the prior art and as influenced by the invention.

The adjustment together of these critical spacing dimensions, S and D, for the cup shield produces a desirably "flattened" cathode erosion-profile and, as a result, a flattened deposition-profile. In FIG. 3 some exemplary profiles are reproduced to demonstrate the effects achieved by following the teachings of the invention. A prior art or "control" sputter system is assumed, for comparison purposes, to exhibit a cathode erosion-profile A and an associated deposition profile A'. These profiles are not atypical. The provision of cup shielding means 8', according to the invention, which has the critical dimensions S and D, flattens both profiles as indicated in curves B and B'. The change in conditions between these pairs of profiles consisted simply in providing the protruding cup-shield. As Table I above shows, a cathode voltage of about −2000 volts obtained.

The cathode-shield geometry of FIG. 2 was effective to eliminate the "dead" zones around the perimeter of the cathode. A uniform (to ±1.5%) current density profile over 90% of the total cathode area was maintained using a 4½" diameter cathode. This percentage increases when larger cathodes are used, since the nonuniformity near the perimeter of the cathode is truly an edge effect independent of the cathode diameter. The corresponding cathode erosion profile can be kept constant over 95% of the area of uniform current density.

Using 7" diameter cathode and anode, a uniform thickness profile (±1.5%) can be maintained over an area of 25 square inches using the invention—well above that in the prior art! This represents 75% of the area of uniform cathode erosion or only 65% of the total cathode area. It can be inferred that in this case the "wall effect" is minimized. It has further been learned that the absolute width of the perimeter band of nonuniform thickness is approximately the same for both configurations: ~1.25". Such a wide band of unusable substrate area obviously represents a much larger fraction of the total electrode area in the 4½" case than in the 7" case. This is reflected in the above figures of 65% vs. 90% usable area in the two cases. From these findings it can be concluded that for a cathode geometry as shown in FIG. 1 to be used in the $10^{-2}$–$10^{-1}$ Torr pressure region, the diameter of the cathode should be at least 3" greater than the expected area of uniform film properties on the substrate. The consequent savings in vessel materials, and more especially in pumping capacity and pump-down times, are evident.

The desirability of this deposition profile flattening through the use of a cup shield is evident since it provides a larger useful anode surface of uniform film thickness. Quantitatively, it has been found that the useful cathode area has been extended from a customary 20% of the total cathode face to about 90% thereof, using the invention. Attendant upon this increase in uniform film area is a vast increase in the film producing efficiency of the apparatus. A second advantage to using such a cup shield is that of allowing a decrease in cathode-vessel wall separation and, hence, a smaller vessel. Where a minimum separation distance (A) between vessel wall and the cathode of about 9 inches was common in the prior art, my inventive cup shield reduces this to about 30 microinches, thus reducing the required vessel diameter from ~24" to ~11" and reducing volume and pumping requirements.

In addition to the prescribed dimensions D and S of the cup shield 8', a further means of flattening the erosion profile and hence the deposition profile of the system is to reduce the "edge effects" on each side of the cathode. In the geometry shown in FIG. 2 these edge effects produced a sharp increase in erosion rate at the edge of the cathode (cf. portions *e*, in curve B). Increased erosion peaks (*e*) detract from uniformity by causing deposition peaks (*e'*). In contrast to findings in the literature, the distance of the apparatus envelope near the cathode, whether at ground, floating or some small externally imposed potential, is now no longer critical with respect to the erosion profile. This is in sharp contrast to present practices in the art.

Figure 5:
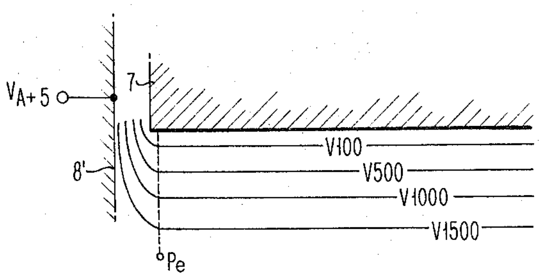
FIG. 5 shows the elements of FIG. 4 as modified by the inventive shield-charging concept.

Since homogeneous film thickness is desired over as large an area as possible, these peaks (*e'*) in the deposition profile reduce the efficient usage of the sputtering areas. My invention greatly relieves this problem and helps to flatten the erosion and deposition profiles by charging the cup-shield. This shield potential is kept close to the anode potential. Experimentally, this has been found to be preferably about 5 volts less than the anode potential. The result of such a charging of the shield is to favorably shape the equi-potential lines $V_1$, $V_2$ and $V_3$ near the cathode edges. These lines are shown in FIG. 5 to have been flattened in the area between the cathode and shield, consequently reducing the obliqueness in field edge-gradient, and hence reducing the obliqueness of incident ion impact. Hence, edge particles erode with less added momentum.

Figure 4:
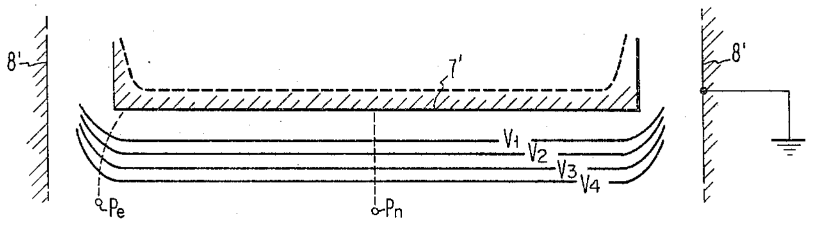
FIG. 4 is an idealized section of a cathode-shield area with equi-potential lines plotted nearby.

As schematically illustrated in FIG. 4, these edge-effects are also due to the increased velocity of particles arriving at the edge of the cathode caused by the sharper potential gradient they have traversed. This difference in potential gradient, or steeper gradient at the cathode edges, is illustrated in the comparison of the incident paths of two bombarding particles in FIG. 4. Here are shown $P_n$ which arrives normal to, and at the center of, cathode surface 7 and edge particle $P_e$ arriving at the edge and traversing the steeper voltage gradient as indicated by its dotted-line path. Steeper gradient means acceleration within a shorter distance; hence, less likelihood of collisions and higher net particle energy. It is evident from the shape of equi-potential lines $V_1$, $V_2$, $V_3$ that $P_e$ will traverse a more oblique potential gradient and hence be accelerated more obliquely to cathode face 7' than $P_n$. Hence, $P_e$ will arrive at cathode 7 with a higher "erodibility" than normally-incident particle $P_n$ at the cathode center since higher energy and obliquely-incident particles tend to erode more cathode material and thus produce the edge peaks *e* evident in the cathode erosion profile B of FIG. 3. This, in turn, can produce deposition peaks *e'* as in profile B'.

There is a third critical distance, namely, the location of the substrate. Workers in the art have stated that particular substrate distances are universally optimum. My invention teaches that this is not so. This location cannot be defined in terms of a constant, although it may be exactly related to the location of the Crookes Dark Space-Negative Glow interface in any particular glow discharge arrangement. However, these regions shift according to a wide number of parameters, some of which are: vessel-electrode geometry, voltage, pressures and current.

It is known that at a constant pressure ($5\times10^{-2}$ Torr) the rate of deposition on a substrate falls off sharply as the substrate is moved further away from the cathode. Since in this pressure region the deposition rate is low and since less than half the cathode sputtered material reaches the anode, the tendency by previous workers has been to place the substrates closer to the cathode. FIG. 3 shows, however, that a minimum distance exists below which the deposited film is nonuniform or "shadowed." The location of this minimum is ultimately related to the distance from the cathode where randomized electron-directionality begins. This is the zone wherein the secondary electrons emitted from the cathode have dissipated most of their energy through collisions and have become directionally randomized. Holding the substrates beyond this distance will prevent "shadow" effects or "dead zones" (cf. profiles C, C′ in FIG. 3) on the cathode. The mean-free-path of the electrons, being pressure-dependent, and their maximum energy, which is determined by the cathode fall potential, will together determine where this directional randomization will begin to take place. Profile C′ in FIG. 3 shows the effect on thickness profile for substrates held too close to the cathode. Such positioning would be that of substrates 37 in FIG. 2 which abuts the CDS-NG interface 30. Such positioning so distorts the field near the center of cathode 7 that electrons emanating therefrom never pass beyond the CDS and, hence, ionize no eroding particles there. This produces practcially zero ion current density and subsequent erosion rate at the center of the cathode with a gradual increase toward the cathode perimeter. Curve C exemplifies this. Associated with this nonuniform erosion is resulting deposition profile C′, exhibiting the central shadow of the intruding substrate. Apparently, many of the secondary electrons emanating from the center of the cathode also collide with the substrate before they can dissipate enough energy through gas collisions to be in optimum energy region for ionization. This, in turn, can also result in fewer ions being formed in front of this central region of the cathode which explains the lower sputtering and subsequent lower deposition on the substrate in this region.

A series of micrographs taken of films at positions corresponding to the experimental points on profile C′ show much larger particles near the center of the anode. Large crystallites are usually associated with higher substrate temperatures. This gradation in particle size reflects mainly a steep temperature gradient, rather than the obviously existing thickness gradient. Noting the lip L on the potential curve V in FIG. 7 will suggest that the field-free region (FF) begins somewhat within the Negative Glow region (NG) so that the potential is in fact a constant there. The effect of locating the substrate somewhat beyond this FF area is to allow most of the electrons which emanate in a substantially normal direction from the face of the cathode to lose this normal velocity and, due to collisions enroute, exhibit velocities in all directions. Such omnidirectionality allows some electrons, through collision, to drive bombarding ions (e.g., Argon) back towards the cathode surface where they can then erode the deposition material.

Hence, according to my invention, one can precisely describe the optimum substrate location as the randomized electron-directionality zone as determined by electron temperature measurements using well known probe techniques. Zone FF begins somewhat beyond the CDS-NG interface. This zone is preferred because, due to the absence of any accelerating field, the electrons in this general area can lose their field-depedent directionality upon collision and not regain any. Since these collisions may be expected to occur within a few millimeters, one may assume substantial randomization about 1 cm. beyond the interface, ±5 mm.

This teaching of an optimum substrate location is one that is new in the art. Heretofore, the prior art has located the substrate almost indiscriminately, some workers prescribing a preferred location at, or close to, the CDS-NG interface—not at a constant-field, randomized-velocity region! The harmful effect of locating a substrate at this interface, or closer to the cathode, has been illustrated above. Hence, film uniformity will suffer if one locates the substrate closer to the cathode than the constant-field region.

Of course, it is desirable to locate the substrate as close to the cathode as is possible, given good film deposition, to minimize vessel size, voltage, pumping capacity, loss of deposition efficiency, etc. Hence, one would locate the substrate within the field-free region, but within this region, as close to the cathode as is possible. In Table II below are illustrated exemplary minimum distances from the cathode for substrate positioning for a glow discharge device such as that shown in FIG. 1.

*Table II*

| Distance from Cathode for— | | $V_k$ (Volts) | Pressure (Microns $H_g$) |
|---|---|---|---|
| End of CDS, mm. | Substrate Location (mm.) | | |
| 12 | 22 | 2,400 | 90μ |
| 8 | 18 | 1,700 | 90μ |
| 28 | 38 | 2,500 | 32μ |
| 23 | 33 | 700 | 32μ |
| 47 | 57 | 2,700 | 20μ |
| 42 | 52 | 1,100 | 20μ |

As is evident from Table II above, the width of the CDS varies inversely with pressure. Width varies directly with cathode voltage. Further, pressure is the dominant control parameter. It thus becomes evident that the minimum substrate distance from the cathode, placing it "well within" the Negative Glow region, varies widely with pressure (inversely) and, to a lesser degree, with cathode voltage (directly). It is suggested as a rough rule-of-thumb that, within normally practical "thin-film" pressure-voltage ranges (i.e., 20–100μ and 1000–3500 v.), a "safe" substrate distance for uniform films would be about 45 mm. (±5 mm.). "Uniform" is assumed to mean within ±1.5% thickness uniformity for useful substrate diameters in the 4–8 inch range. However, a more frequently used sputtering range would be from 30–200μ and 1–5000 volts wherein the universally good uniformity (±1% thickness) distance for the substrate would be about 30 mm., ±5 mm. This would except the very thin film pressures below 30μ. These pressures must be understood as "absolute" pressures, independent of the chemical nature of the vessel atmosphere, since the pressure gauges (e.g., thermocouple-ionization types) were all carefully adjusted for the atmosphere used (e.g., for Argon).

In FIG. 6 there is shown schematically the same general glow discharge apparatus as in FIG. 1 with the exception that the walls 9′ of the vessel are electrostatically charged and are separated at least a minimum distance X from the substrate (anode) 10′. This separation serves partially to cool anode 10′ as explained below. Cooling is important because deposition efficiencies have been found to be dependent upon the temperature of the anode. A very hot anode will revaporize, dissipating the deposited material and, hence, oppose the deposition process. Localized heating of the anode can produce localized deposition variations, resulting in a non-uniform coating with variations in thickness as well as in crystalline properties. Hence, it becomes important to cool anode 10.

Where the substrate is not an integral part of the anode (unlike FIG. 6) and mounted thereon (e.g. in FIG. 1), it is presumed that cooling the anode also cools the sputtered substrate. For instance, in FIG. 1 substrate 90 is firmly fastened to the anode 10 without any stressing thereof or protrusions therefrom. Stress can affect magnetic properties and protrusions will produce "shadow-areas," i.e., deposition voids. Since much of this heating, especially the localized heating, is caused by bombarding electrons, my invention teaches a means of eliminating many of these electrons by charging the conductive vessel walls 9 of the glow discharge container slightly more positive than the anode, together with a prescribed wall-anode separation. Thus, the wall may attract the majority of these anode-bombarding electrons without seriously affecting the sputtering process. This is indicated schematially by showing a voltage source $V_{A+C}$ as connected directly to vessel wall 9 which, in turn, is made conductive. This voltage is a few volts (+C) more positive than the anode potential ($V_A$). About +20 volts has been found suitable.

In conjunction with the charging of wall 9, it is important to separate the wall from the substrate 10'' by a minimum distance X from the substrate-anode. The theoretical basis for this is twofold: to prevent substrate contamination and to increase both deposition efficiency and film uniformity. But wall-propinquity detracts from this efficiency and uniformity by trapping certain of the sputtered particles, as seen below.

In the energy range used in this work (2000–3500 ev.) and assuming a 90° angle of incidence for ions over most of the cathode surface, a cosine distribution of cathode-ejected material from any point source on the cathode can be assumed if a polycrystalline cathode surface is involved. From this it follows that the radial density of sputtered particles in any projected plane parallel to the cathode should be uniform. It is important to realize, however, that by the time these particles reach the vicinity of the substrate in the negative glow region, their movement is essentially diffusion controlled in the pressure region of interest here. Such diffusion-transport randomizes particle incidence for uniform film.

However, the danger is that, while a given impact-eroded particle $P_1$, may randomly collide with a particle alonge plane 9'' and assume a new direction of incidence $P_2$, it may also be trapped by the wall if located there. This has the consequence that any object near the substrate may serve as an irreversible trap for the condensible sputtered material. Thus, if particle $P_1$ struck the vessel wall at plane 9'' near the anode 10', it would adhere there and be lost for deposition purposes. This, in turn, will produce a wall-effect following profile D'. Similarly, a shield or masking arrangement such as 92 or 93 in FIG. 1, which has not been sufficiently separated from the anode assembly, will alter the thickness profile markedly. Therefore, a wall-separation X surrounding the substrate is prescribed according to the invention, since the proximity of the envelope walls or any macroscopic particle-sink will influence both the thickness profile and the efficiency of the deposition.

Wall-separation also reduces contamination. Unavoidably, the surface of wall 9' contains undesirable microscopic impurities. These deposits remain relatively harmless while occluded to the wall, but the impact of sputtered particles ($P_1$) may release and propel them toward the substrate where they can radically impair the character of the sputtered film. Such microscopic impurities, for instance, can render many super-conductive films useless when released. It has been found, however, that the minimum wall-separation X, which is required to substantially eliminate the wall-effect D' above, also serves to prevent any significant wall-generated contamination.

According to my invention, a practical range for the minimum wall-separation (X) is about 2–4 inches from all portions of the substrate anode 10' The preferred separation has been found to be at least 2 inches so as to yield a 70% useful substrate area (for the case where the substrate area is the same as the cathode area). Reducing this separation to about ¾'' reduces the useful substrate area to about 30%. Hence, the substrate-wall separation drastically affects the deposition efficiency as well as the uniformity of the film deposited impairing efficiency to greater degrees for smaller deposition areas.

In the inventive modifications of a sputtering system as described above, several important new control techniques have been discovered—techniques yielding a control over particle size and film morphology, over chemical and crystallographic definition that has been heretofore unattainable. This control is not only novel, but extremely precise and has been demonstrated in producing such magnetic films as iron, nickel, cobalt and nickel-iron. For thin magnetic nickel-iron films, for example, the inventive system has allowed the production of films with consistently reproducible properties—properties such as: coercivity, anisotropy energy, dispersion of easy direction of magnetization, and skew (over 4'' x 4'' areas). In practice, the invention has been used to produce very thin films and these thin films have exhibited reproducible control over such useful physical properties as particle size, crystallinity, deposition rate and morphology. For example, iron films which are polycrystalline and exhibit no evidence of a preferred crystal orientation have been rendered, even while using single crystal substrates held at 450° C. This is in sharp contrast with high vacuum evaporated iron films where epitaxial growth is well known at these substrate temperatures. Highly oriented iron films, when produced by evaporation, also result on amorphous substrates held in a similar high pressure environment, unlike sputtered films which, under similar pressures, may be entirely unoriented. Alternatively, single crystal films may also be rendered by epitaxy in a glow discharge showing the versatility of the technique over vapor deposition.

Deposition of a wider variety of particle sizes is facilitated by the invention, since it extends the deposition-rate range and minimizes wall impurities. Spectrophotometric analysis, together with micro-weighings of Ni-Fe films produced with the instant device, has revealed films of 100% purity (within 1%). Such purity is unexpectedly high for any sputtering system.

As for magnetic properties, both reproducibility and lack of unwanted magnetic orientation have been achieved. In a glow discharge operating at higher pressures, oblique incidence anisotropy has been remedied. This is because incident particles have been made to arrive at the substrate from all directions, so that no agglomeration of crystallites into chains is to be expected or was found; that is, no oblique incidence anisotropy effects are observed. The values of coercivity, remanent magnetization, and ratio of remanent-to-saturated magnetization are considerably larger than those recorded for polycrystalline high-vacuum-evaporated films of similar thicknesses, particle size and shapes, deposited on the same type substrate at similar temperatures.

The above results achieved with the inventive sputtering system may be further optimized using the atmosphere-handling subsystem described below. It will be recognized that for a contained glow discharge, a maximum throughput of precleaned gas compatible with pressure requirements will minimize the film contamination by foreign reactive gas species originating from the walls of the apparatus during film deposition. The entire apparatus can be effectively precleaned through low wattage ion bombardment by a non-contained glow discharge. By introducing a gas-atmosphere-mixture, such as argon and oxygen, a partial pressure of the reactive gas can be maintained and magnetic films of metals and various oxidation states of a particular allotropic form (for example, gamma $Fe_2O_3$, rather than non-ferromagnetic alpha $Fe_2O_3$) can be produced selectively.

Figure 8:
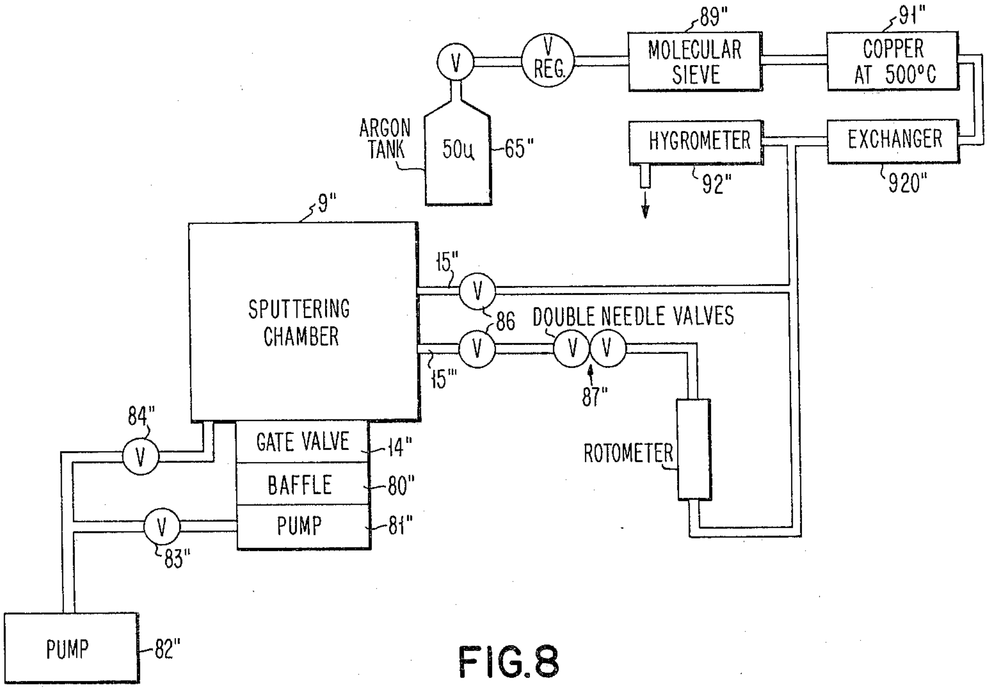
FIG. 8 shows schematically a gas-flushing and pumping system apt for implementing the invention.

Such a gas-throughput flow system is shown in FIG. 8. This precise pumping system can flush the precleaned gas through the system during glow discharge. The gas is introduced at valves 15″, 15‴, and may be pumped out through outlet valve 14″. Double-needle valve 87″ is used as a fine control for the amount of gas introduced. The sputtering chamber 9″ is pumped down through rough-port 84″ by the fore pump 82″ at a rate of about 375 liters per minute. Valve 83 is open and valve 14″ is closed until a pressure of about .015 mm. Hg is attained, at which point port 84″ is closed and valve 14″ cut into the system. The diffusion pump 81″ is of the low vapor pressure silicone oil type operating at 700 liters per second and able to take the system down to about $1\times10^{-7}$ mm. Hg. A very thorough series of precleaning steps is next performed within the vessel. Gas flushing is now initiated and then film deposition begins. Toggle valve 86 is opened to establish final sputtering pressure. The unthrottled diffusion pump 81″ (at maximum pump speed for this pressure) in conjunction with the bleeder leak 87″, thus serves to replace the vessel atmosphere about once per second with precleaned, low pressure, inert gas from reservoir 65″. A suitable such gas would be precleaned Argon at about 50 microns Hg pressure. Molecular sieve 89″ is provided to dry the inert gas. Freshly prepared copper filings are provided at 500° C. in filter 91″ to remove any oxygen. Water-cooled heat exchange 920″ cools the gas. Hygrometer 92″ is provided to monitor the amount, in p.p.m., of $H_2O$ in the gas stream.

An ionization gauge, such as gauge 3 shown in FIG. 1, is useful as one control of the evacuation level within the chamber; however, it has been observed that a far more sensitive control is the ion current measurement in the discharge chamber. Calibrated thermo-couple vacuum gauges 2, as well as ionization gauges, were used to check the pressure of the vessel. Thermo-couple inlets 1 are also provided. Removable shield 92 was provided, being collapsible and extensible via handle 920, to mask the substrate 90 from unwanted discharges, for instance, during the cleanup-glow discharge. FIG. 1 shows these instruments.

The recommended cleanup-sputtering process proceeds as follows: The system is pumped to $6\times10^{-6}$ Torr. Argon is introduced up to 30 microns and all vessel elements are subjected to a confined glow discharge. For this discharge, shield 92 is extended over substrate 90 and charged, serving as the anode during cleanup-sputtering. Thus, shield 92 should be made of metal. Then the vessel 9 is pumped down to $2\times10^{-7}$ Torr, all parts again being cleaned with Argon at 30 microns. Then the substrate is unshielded, and subjected to low energy ion bombardment by reversing electrode polarity. Next, with substrate shield 90 replaced, the cathode is then sputtered at final sputtering conditions for some time. Then the shield is removed. The system is now cleaned and ready for sputtering operation.

It will be apparent that the techniques of the novel sputtering method described above have application in different impact evaporation environments other than those of the selected examples described and illustrated. Workers in the art will appreciate, then, that these examples are only illustrative of some of the applications of the inventive teachings and that numerous other applications may be readily inferred. Hence, application of the above novel teachings to any analogous impact evaporation environments should be taken as lying within the scope and spirit of the present claimed invention. Such environments would be: deposition systems for studying the physical and chemical properties of alloys and compounds, the study of gaseous electronic mechanisms, for instance as applied to ionization gauges, vac-ion pumps, etc., or for crystalline studies, sputtering systems used as a vacuum gauge, as a vacuum pump, or for refining materials to a higher purity. Other related applications will be apparent to those skilled in the art.

While the invention has been particularly shown and described with reference to the preferred embodiments thereof, it will be understood by those skilled in the art that various changes in form and details, in constituents and steps, and concentrations and ranges may be made without departing from the spirit and scope of the claimed invention.

What I claim is:

1. The method of coating an article by sputtering, wherein said article is arranged within a closed vessel having a cathode and an anode, comprising the steps of:
   imposing within said vessel a suitable pressure of ionizable gas and a suitable anode-cathode voltage potential difference to thereby obtain abnormal glow discharge conditions therein,
   shielding the nondischarging surfaces of said cathode at a voltage potential approximating that of said anode and at a distance from said cathode of less than the axial length of the Crookes Dark Space obtaining at the given glow discharge conditions, said shielding extending up to approximately ⅜ inch beyond the discharge surface of said cathode, and
   disposing said anode at a distance from said cathode greater than said axial length of the Crookes Dark Space and in the closest zone of randomized electron-directionality.

2. The method of sputtering of claim 1 wherein the shielding step thereof comprises:
   arranging a shielding means such that the interior surfaces thereof effectively define a shape corresponding to, and larger than, the nondischarge surfaces of said cathode;
   disposing said shielding means such that the interior surfaces thereof are separated from the nondischarge surfaces of said cathode a uniform distance of less than the axial length of the Crookes Dark Space obtaining at the given glow discharge conditions, said shielding means extending approximately ⅛ to ⅜ inch beyond the discharge surface of said cathode into the inter-electrode space; and
   biasing said shielding means at a voltage approximating that of said anode.

3. The method of sputtering of claim 1 wherein said shielding step further comprises:
   establishing said shielding voltage potential at a value more positive than the voltage potential of said anode by no more than approximately five volts.

References Cited by the Examiner

UNITED STATES PATENTS

| | | | |
|---|---|---|---|
| 2,219,611 | 10/1940 | Berghaus et al. | 204—298 |
| 2,305,758 | 12/1942 | Berghaus et al. | 204—192 |

JOHN H. MACK, *Primary Examiner.*

R. MIHALEK, *Examiner.*